J. HOLLIS.
TROLLEY STAND.
APPLICATION FILED OCT. 3, 1914.
1,324,049.
Patented Dec. 9, 1919.
2 SHEETS—SHEET 2.
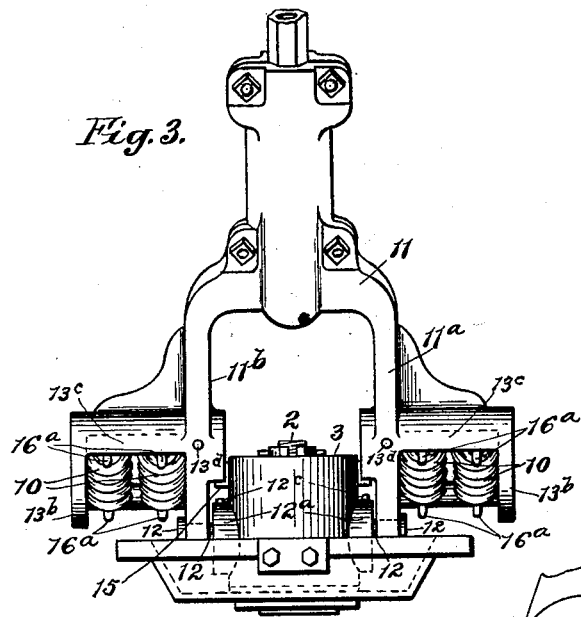
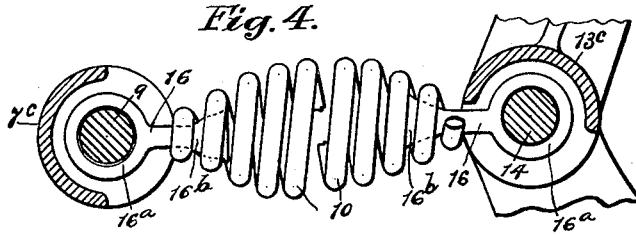
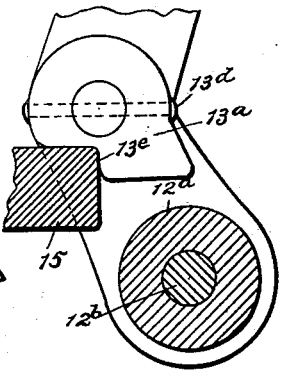
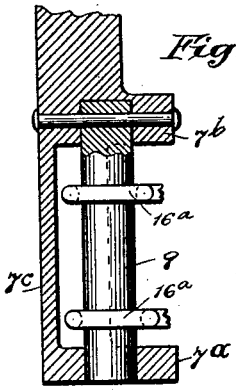
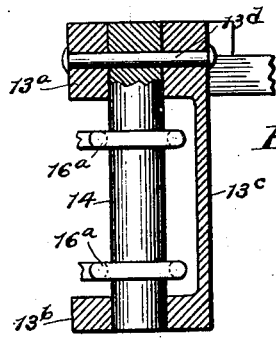
Witnesses.
S. W. Brainard.
W. H. Percy.
Inventor.
Joseph Hollis
By Edward R. Alexander
Attorney.

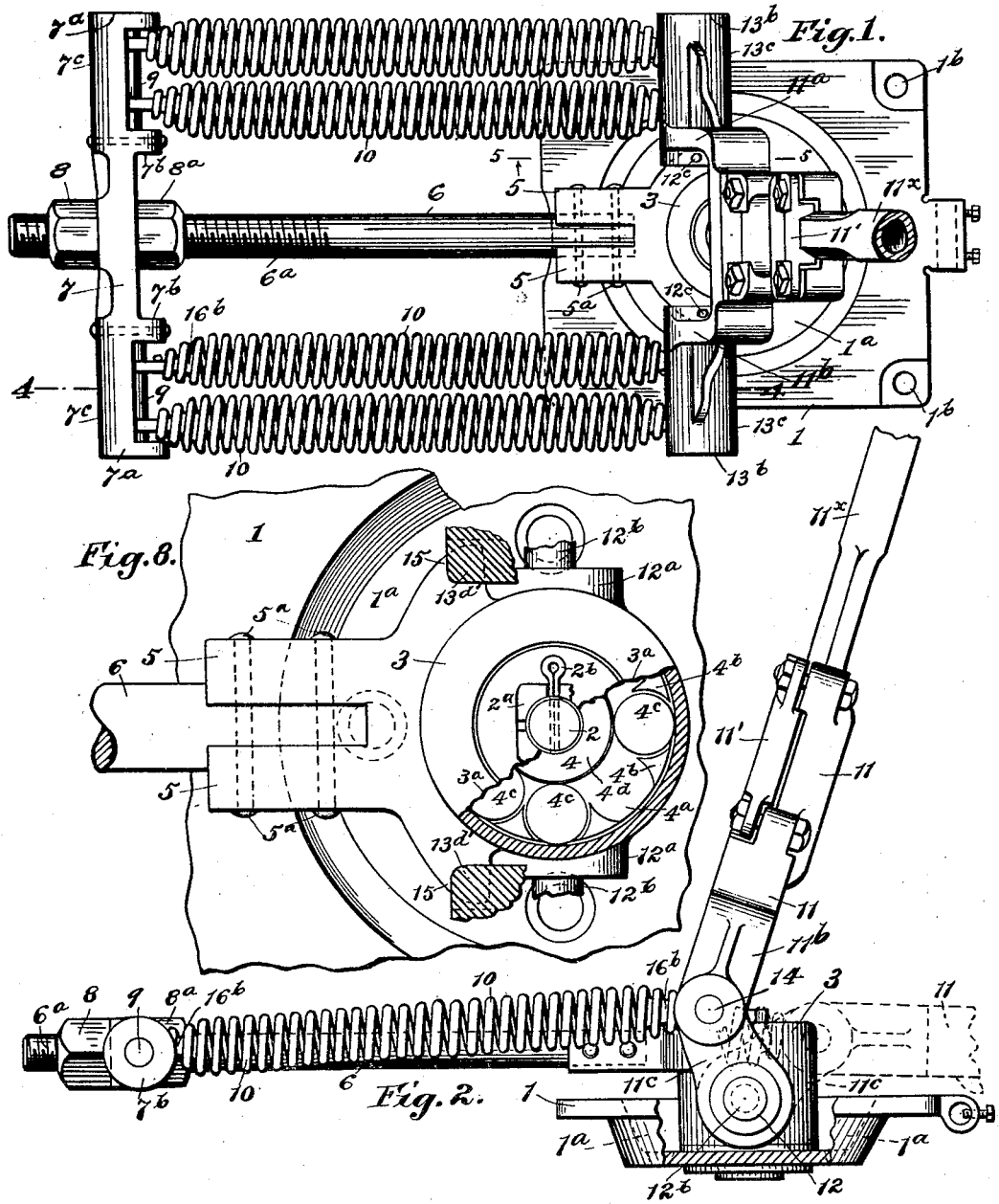

UNITED STATES PATENT OFFICE.

JOSEPH HOLLIS, OF CANTON, OHIO, ASSIGNOR TO JOHN E. McLAIN, OF CANTON, OHIO.

TROLLEY-STAND.

1,324,049.   Specification of Letters Patent.   Patented Dec. 9, 1919.

Application filed October 3, 1914. Serial No. 864,784.

*To all whom it may concern:*

Be it known that I, JOSEPH HOLLIS, citizen of the United States, residing at Canton, in the county of Stark and State of Ohio, have invented certain new and useful Improvements in and Relating to Trolley-Stands, of which the following is a specification.

This invention relates to a trolley stand or base for electrically propelled cars and more particularly to that type of stand in which the trolley pole is adapted to swing both in vertical and horizontal directions.

For the purpose of illustration, I have in the accompanying drawings shown and herein described one form of mechanism embodying my invention.

Figure 1 is a top plan view of a trolley stand embodying my invention.

Figs. 2 and 3 are side and rear elevations, respectively, of the stand.

Fig. 4 is a fragmentary section on the line 4—4 of Fig. 1.

Fig. 5 is a fragmentary section on the line 5—5 of Fig. 1.

Figs. 6 and 7 are fragmentary sectional views of the supporting devices for the elevating springs.

Fig. 8 is a fragmentary plan view of the base and trolley stand hub, the latter being broken away to show the anti-friction bearings therefor.

In the drawings, 1 indicates a base plate having a central depression $1^a$ to form a dish-like member. The member 1 is adapted to be secured to the top of a car in the usual manner, openings $1^b$ being preferably provided to receive bolts or like devices for this purpose.

2 indicates a vertically disposed pin which is arranged centrally of the depression $1^a$ and forms the shaft about which the trolley pole swings horizontally.

3 indicates a hub member which is rotatably mounted on the pin 2. Anti-friction bearings 4 may be provided between the hub member 3 and shaft pin 2. The bearings 4 may comprise a ring $4^a$ having upwardly extending spacers $4^b$ and rollers $4^c$ arranged between the spacers. The hub member 3 may be provided with an internal flange $3^a$, which rides on the upper ends of the rollers $4^b$. The pin 2 extends through the opening formed by the circumferential edge of the flange $3^a$ and carries at its outer end a nut or cap $2^a$ which fits over the flange $3^a$ and thus prevents endwise movement of the hub member 3 on the pin 2 when the parts are once assembled. The nut $2^a$ may be locked against turning by any form of locking means, one example thereof being indicated by $2^b$ in the drawings.

5 indicates a pair of arms preferably formed integrally with and extending laterally from one side of the hub member 3. The arms 5 form a space between them to receive the inner end of a strut rod 6. The rod 6 is preferably rigidly secured between the arms 5 by cross pins $5^a$.

7 indicates a cross bar carried by the strut rod 6 at or near its outer end. The cross bar is, by preference, adjustably secured to the strut rod 6, by nuts 8, $8^a$, disposed on opposite sides of the bar and fitting screw threads $6^a$ on the strut rod 6. The strut rod 6 may be provided with screw threads $6^a$ for a considerable distance throughout its length and thereby allow a wide range of adjustment of the cross bar 7.

$7^a$, $7^b$, indicate a pair of spaced supports arranged at each end of the cross bar 7. 9 indicates a cross rod supported at its opposite ends in each pair of supports $7^a$, $7^b$. The supports $7^a$, $7^b$ are preferably formed with axial openings to receive the opposite ends of the rods 9. The rods 9 serve as connecting devices for the outer ends of elevating coiled springs 10, which will be later described. The supports $7^a$, $7^b$, constituting each pair are connected together by a plate $7^c$ which is preferably curved on longitudinal lines for strengthening purposes. The supports $7^a$, $7^b$, and plate $7^c$ are preferably formed integrally with each other and with the cross bar 7 as shown in the drawings. The supports $7^a$, $7^b$ and plate $7^c$ form a casing to protect the connection between the adjacent ends of the springs 10 and the rod 9.

11 indicates a trolley pole carrier. At its upper end the carrier is provided with a socket, one wall $11'$ of which is detachable to permit the insertion and removal of a trolley pole $11^x$. At its lower end the carrier is bifurcated, as shown at $11^a$, $11^b$, so as to straddle the hub member 3 and permit swinging of the carrier through a long arc.

12 indicates the pivot devices arranged between the free ends of the carrier legs $11^a$, $11^b$, and the hub member 3. These devices preferably comprise bosses 12ª projecting laterally from the opposite sides of the hub member 3, and pivot pins 12ᵇ having their inner ends mounted in openings formed centrally in the outer ends of the bosses 12ª and in a line which cuts the axis about which the carrier swings horizontally. As will be seen from the drawings, the bosses are arranged within or partly within the depression 1ª of the base plate so that the pivot or axis about which the pole carrier 11 swings in vertical directions will be as low down as possible. When the bosses are arranged in this position, the free ends of the bifurcations or legs 11ª, 11ᵇ, are curved as shown at 11ᶜ, to permit the pole, when swung downwardly on top of the car, to be disposed in a plane substantially parallel thereto, as shown in dotted lines in Fig. 2. The pins 12ᵇ extend through pivot openings in the free ends of the bifurcations 11ª. The outer ends of the pins 12ᵇ are preferably headed; their inner ends may be fixed within the openings in the bosses 12ª by cross pins 12ᶜ which may have their opposite ends headed or riveted.

13ª, 13ᵇ, indicate a pair of spaced supports carried by each of the bifurcations 11ª, 11ᵇ, above their pivot openings. The supports 13ª, 13ᵇ, constituting each pair are connected together by a plate 13ᶜ, preferably curved on longitudinal lines, for strengthening purposes. Each plate 13ᶜ and the adjacent supports 13ª, 13ᵇ, are preferably formed integrally with each other and with the adjacent bifurcation, as shown in Figs. 3 and 7. The walls of the supports 13ª, 13ᵇ, and connecting plate 13ᶜ coöperate to form a casing which protects the inner ends of the elevating springs.

14 indicates a rod extending between and supported at its opposite ends in each pair of supports 13ª, 13ᵇ. The supports are preferably formed with axial openings to receive the opposite ends of the rod 14.

The inner support 13ª is formed with suitable openings through which a lock pin 13ᵈ extends, this pin also extending through an opening in the rod 14, to lock the pin in position.

15 indicates a pair of stops, preferably formed integrally with and extending laterally from the opposite sides of the hub member 3. The stops 15 are arranged in the path of movement of the carrier legs 11ª, 11ᵇ; they operate to limit upward movement of the trolley pole carrier beyond a predetermined position. As shown in Fig. 5, the inner end walls of the supports 13ª are cut away to form flat shoulders 13ᵉ which engage the stops 15.

The springs 10 are connected at their opposite ends to the rods 9 and 14. The springs 10 are placed under tension when the pole carrier 11 is swung downwardly toward a horizontal position, hence they tend to swing the pole carrier upwardly and maintain it against the overhead wire. I prefer to provide four springs 10, two of which are arranged on either side of the strut rod 6. The opposite ends of each spring are preferably connected to the adjacent rods 9, 14, by links 16. Each link 16 is provided at one end with a ring 16ª through which loosely fits the adjacent rod; at its opposite end the link 16 is provided with an enlargement or head 16ᵇ which fits within the adjacent end of the spring 10, the convolutions of which are reduced to form a shoulder or bearing against which the head engages.

The springs 10 are preferably of such length that they are relieved substantially of all tension when the bifurcations 11ª, 11ᵇ, engage with the stops 15. This arrangement is preferable because in the event the trolley pole jumps the overhead wire and swings upwardly, the only force acting on the pole will be that due to its momentum. From this it follows that the strains and stresses upon the carrier, the hub member 3 and other parts of the stand will be considerably reduced.

From the foregoing description it will be seen that the pairs of rods 9, 14, for the opposite ends of the springs 10 are supported in parallel relationship to each other by spaced supports. This arrangement overcomes any tendency of the outermost springs to bend laterally the outer ends of the projecting rods and thus produce unequal stretching effect on the springs 10 when the carrier is pulled down toward or to a horizontal position; it also overcomes any tendency to throw on the pivot devices 12 any unequal strains which tend to affect the proper swinging movements of the carrier.

It will also be seen from the drawings that the plates 7ᶜ, which connect the supports 7ª, 7ᵇ, are arranged at substantially right angles to the direction in which the springs 10 act, and that the plates 13ᶜ, which connect the supports 13ª, 13ᵇ, are so arranged that they assume a position at substantially right angles to the direction in which the springs 10 act when they are stretched to their extreme position, that is, when the pole carrier is swung to a substantially horizontal position. By this construction and arrangement the plates 7ᶜ, 13ᶜ, operate to rigidly support the outermost supporting members 7ª, 13ᵇ, of each pair of supports and thus prevent any distortion of the rods 9, 14.

By means of the structural elements herein disclosed I have provided a low down trolley stand, at the same time I have arranged the trunnions on which the carrier swings in line with the vertical shaft or pin 2.

By providing a dished base plate 1, mounting the bifurcated ends of the pole carrier 11 within the depression 1ª of the plate 1 and straddling the hub member 3 with pivot connections between the bifurcated ends and opposite sides of the hub member, it will be seen that these parts coöperate to produce a low down trolley stand. This construction permits the strut rod 6 and the elevating springs 10 to be arranged in a substantially horizontal plane slightly above the upper surface of the plate 1, at the same time it permits the inner ends of the springs 10 to be connected to the bifurcations at a suitable distance from their pivots whereby the action of the springs will be effective to swing the carrier upwardly.

To those skilled in the art of making mechanism of the class described, many alterations in construction and widely differing embodiments and applications of my invention will suggest themselves, without departing from the spirit and scope thereof. My disclosures and the description herein are purely illustrative, and are not intended to be in any sense limiting.

I am aware of the fact that it has been heretofore proposed to correlate elements somewhat like applicant's and arrange the pivotal connection between the bifurcated ends of the trolley pole carrier and the hub member tangent to one side of the hub member, so that the thrust between the hub member and the trolley pole carrier will be taken at one point on the hub member rather than at two diametrically opposed points, as contemplated by my invention. By arranging the axis for the pivotal connection between the hub member and the trolley pole carrier as I have done so that it intersects the axis of the pin 2, I have furthermore materially relieved the shearing and bending stresses upon this pin, as compared with any of the earlier structures of which I am aware.

What I claim is:

1. In a trolley stand, the combination of supporting means, a pole carrier pivotally mounted on said supporting means to swing in vertical directions, a strut rod mounted on said supporting means, a cross bar carried by the outer end of said strut rod, pairs of connected supports, one pair being carried by the cross bar and the other pair being carried by the pole carrier, a rod supported at its opposite ends by each pair of supports, and a spring connected at its opposite ends to said rods.

2. In a trolley stand, the combination of supporting means, a pole carrier pivotally mounted on said supporting means to swing in vertical directions, a strut rod mounted on said supporting means, a cross bar carried by the outer end of said strut rod, a pair of supports connected together by a curved plate and carried by the cross bar, a pair of supports connected together by a curved plate and carried by the pole carrier, a rod supported at its opposite ends by each pair of supports, and a spring connected at its opposite ends to said rods.

3. In a trolley stand, the combination of supporting means, a pole carrier pivotally mounted on said supporting means to swing in vertical directions, a strut rod carried by said supporting means, a cross bar carried by the outer end of said strut rod, a pair of supports connected together by a curved plate and carried by the cross bar, a pair of supports connected together by a curved plate and carried by the pole carrier, a rod supported at its opposite ends by each pair of supports, and a spring connected at its opposite ends to said rods, said connecting plates being arranged at right angles to the direction in which said spring acts when placed under tension.

4. In a trolley stand, the combination of supporting means, a bifurcated pole carrier having a pivotal connections between its bifurcations and the opposite sides of said supporting means, whereby the pole carrier is adapted to swing in vertical directions, a strut rod carried by the supporting means, a cross bar mounted on said strut rod, pairs of alined connected supports carried by the opposite ends of the cross bar, pairs of alined connected supports carried by the bifurcations of said pole carrier, a rod supported at its opposite ends by each pair of supports, and an elevating spring connected at its opposite ends to the rods carried by the supports on the cross bar and on the bifurcation at each side of the strut rod.

5. In a trolley stand, the combination of a base plate, a vertical pin carried by said base plate, a hub member mounted to rotate on said pin, a pole carrier having bifurcations straddling said hub member, pivot devices between the free ends of said bifurcations and the opposite adjacent sides of the hub member, the axis of the pivot devices being in a line cutting the axis of said vertical pin, a strut rod connected to said hub member above the pivot devices between the bifurcations and said hub member and extending laterally therefrom, and springs connected to said strut rod at their outer ends and at their inner ends connected to said bifurcations above the pivots between said bifurcations and hub member.

6. In a trolley stand, the combination of a support having a strut member, a pole carrier having bifurcations straddling said support and pivoted thereto, rods connected to and extending laterally from said bifurcations, springs connected to said strut rod and to said rods for elevating said pole carrier, and means connected to said pole carrier for supporting the outer ends of said rods.

7. In a trolley stand, the combination of a support having a strut member provided with laterally projecting rods, a pole carrier having bifurcations straddling said support and pivoted thereto, springs connected to said pole carrier and to said rods provided on said strut member, and means connected to said strut member for supporting the outer ends of said rods.

8. In a trolley stand, the combination of a support having a strut member provided with laterally extending rods, a pole carrier having bifurcations straddling said support and pivoted thereto, rods connected to and extending laterally from said bifurcations, springs connected at their opposite ends to the rods provided on said strut member and the rods connected to said bifurcations, means connected to said strut member for supporting the outer ends of the rods provided thereon, and means connected to said bifurcations for supporting the outer ends of the rods extending laterally therefrom.

In testimony whereof I affix my signature, in the presence of two witnesses.

JOSEPH HOLLIS.

Witnesses:
 GRACE M. BELL,
 A. M. MCCARTY.